United States Patent
Sun

(10) Patent No.: US 9,697,183 B2
(45) Date of Patent: Jul. 4, 2017

(54) CLIENT SIDE PAGE PROCESSING

(71) Applicant: Alibaba Group Holding Limited, George Town (KY)

(72) Inventor: Zhongwei Sun, Beijing (CN)

(73) Assignee: Alibaba Group Holding Limited (KY)

( * ) Notice: Subject to any disclaimer, the term of this patent is extended or adjusted under 35 U.S.C. 154(b) by 169 days.

(21) Appl. No.: 14/255,240

(22) Filed: Apr. 17, 2014

(65) Prior Publication Data

US 2014/0317482 A1    Oct. 23, 2014

(30) Foreign Application Priority Data

Apr. 19, 2013 (CN) .......................... 2013 1 0137232

(51) Int. Cl.
*G06F 17/00* (2006.01)
*G06F 17/22* (2006.01)
*G06F 17/30* (2006.01)
*G06F 17/21* (2006.01)

(52) U.S. Cl.
CPC ........ *G06F 17/2235* (2013.01); *G06F 17/211* (2013.01); *G06F 17/30887* (2013.01); *G06F 17/30896* (2013.01); *G06F 17/30905* (2013.01)

(58) Field of Classification Search
CPC .................. G06F 17/2235; G06F 17/30887
USPC ......................................... 715/204, 205, 208
See application file for complete search history.

(56) References Cited

U.S. PATENT DOCUMENTS

| | | | |
|---|---|---|---|
| 7,584,300 B2 | 9/2009 | Fukuzato | |
| 7,853,873 B2 | 12/2010 | Gotoh et al. | |
| 7,885,950 B2 | 2/2011 | Hawkins | |
| 7,970,816 B2 | 6/2011 | Chess et al. | |
| 8,726,174 B2 | 5/2014 | Ehret et al. | |
| 2004/0019626 A1 | 1/2004 | Shepherd et al. | |
| 2006/0167860 A1* | 7/2006 | Eliashberg | G06Q 30/06 |
| 2009/0276488 A1 | 11/2009 | Alstad | |
| 2011/0264508 A1* | 10/2011 | Harik | G06Q 30/02 705/14.42 |
| 2012/0084630 A1 | 4/2012 | Meiskey et al. | |

(Continued)

FOREIGN PATENT DOCUMENTS

| | | |
|---|---|---|
| JP | 2003223454 | 8/2003 |
| JP | 2011100208 | 5/2011 |
| JP | 2012123598 | 6/2012 |

*Primary Examiner* — Stephen Hong
*Assistant Examiner* — Matthew Ludwig
(74) *Attorney, Agent, or Firm* — Van Pelt, Yi & James LLP

(57) ABSTRACT

Client side page processing is disclosed, including: sending, from within an application executing on a client device, a request for webpage data to a server; receiving the webpage data, wherein the webpage data includes one or more links and code implementing a set of web address interception processing logic; presenting, within the application, the one or more links within the application based on the webpage data; in response to a user selection of a link of the one or more links, using at least a portion of the set of web address interception processing logic corresponding to a web address associated with the link to determine attribute information associated with a target page; selecting a predetermined presentation format from a plurality of predetermined presentation formats based on the attribute information associated with the target page; and presenting the target page based on the selected predetermined presentation format.

20 Claims, 7 Drawing Sheets

(56) References Cited

U.S. PATENT DOCUMENTS

2013/0074131 A1* 3/2013 Cerveau ............ H04N 21/2387
                                                                725/88
2013/0332277 A1* 12/2013 Faith ................. G06Q 30/0239
                                                              705/14.54

* cited by examiner

CLIENT SIDE PAGE PROCESSING

CROSS REFERENCE TO OTHER APPLICATIONS

This application claims priority to People's Republic of China Patent Application No. 201310137232.7 entitled A PAGE PROCESSING METHOD AND DEVICE AND A PAGE GENERATION METHOD AND DEVICE, filed Apr. 19, 2013 which is incorporated herein by reference for all purposes.

FIELD OF THE INVENTION

The present application involves the field of mobile internet technology. In particular, the present application relates to client side page processing techniques.

BACKGROUND OF THE INVENTION

Mobile internet technology is becoming more prevalent. Many people frequently use mobile devices to browse webpages. In order to improve the user experience with respect to mobile browsing, the development of page displays on mobile devices is becoming increasingly important.

Conventionally, in the area of mobile client development, hybrid applications are routinely used to achieve page display within an application executing at a mobile client (as opposed to displaying within the mobile client's default web browser application). To give an example, in the Android™ platform, the WebView functionality allows webpages to be displayed in a native format. Displaying webpages via the WebView functionality enables the display of webpages in various predetermined formats that can be operated on natively by the client (e.g., to realize different page effects or page transition effects), which can enhance the user experience. In order to achieve the effect of displaying the webpage in native view format (e.g., the format of viewing webpages that is native to the client), interception rules are typically set up on the client to capture the address (i.e., Uniform Resource Locator (URL)) of a selected link of the webpage and to perform matching and logical judgment processing of the captured URL in order to obtain the relevant information of the target page corresponding to the selected link. The relevant information of the target page may include formatting information or other attribute information that can be used to assist the mobile client application in judging which technique or which predetermined page format should be used to display the target page.

Because webpage content and attributes could change over time, the web address (e.g., URL) could also change. However, URL changes require modification to the URL matching and logical judgment rules. Moreover, it may also be necessary to modify URL matching and logical judgment rules for business reasons or other considerations. Therefore, the client side URL interception rules and matching and logical judgment rules stored at the client side must be modified accordingly. However, conventionally, the client side URL interception rules and matching and logical judgment rules are typically included with whichever version of the application is currently installed at the client device. Therefore, transferring modified client side URL interception rules and matching and logical judgment rules to the client requires the client device to download an updated version of the application that includes the modified client side URL interception rules and matching and logical judgment rules. However, dynamic updates of client versions that have already been published are not easy. To address this problem, conventionally, a new client version of the application that includes the modified client side URL interception rules and matching and logical judgment rules is made available for the user to access (e.g., in an application store). But developing new versions of an application increases development costs and resource consumption. Furthermore, users are also then required to update their versions of the application frequently, which can be very inconvenient.

Although partial dynamic updating of published client versions is possible on some operating platforms (e.g., such as the Android platform), certain technical means must be employed to bypass restrictions. However, bypassing restrictions may result in a high degree of technical difficulty and a correspondingly greater degree of update complexity, making feasibility very low.

Moreover, conventionally, URL interception to retrieve the target page information is usually performed on the client side, but data such as Document Object Model (DOM) data is not easily captured, which can be inconvenient.

BRIEF DESCRIPTION OF THE DRAWINGS

Various embodiments of the invention are disclosed in the following detailed description and the accompanying drawings.

DETAILED DESCRIPTION

Figure 1:
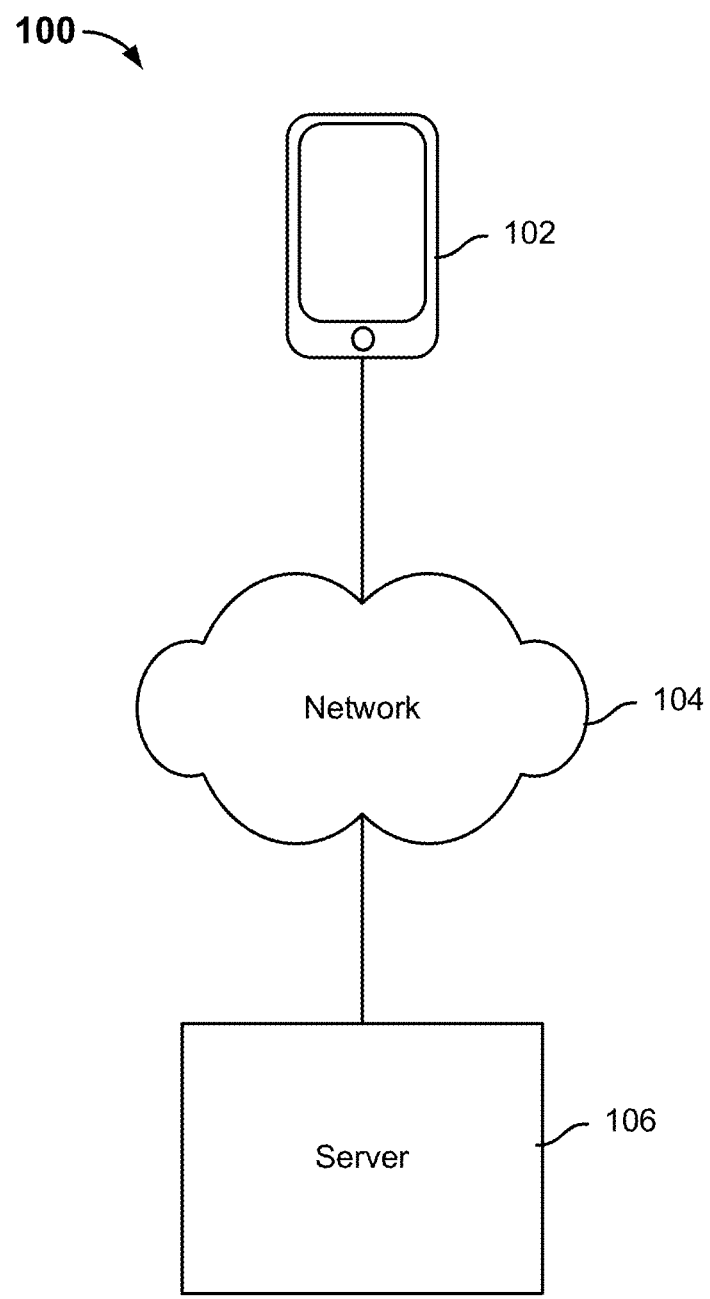
FIG. 1 is a diagram showing an embodiment of a system for client side page processing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of client side page processing are described herein. A request for webpage data is sent from within an application executing on a client device to a server. The webpage data is received at the client device. The webpage data includes one or more links and code implementing the set of web address interception processing logic. Code implementing the set of web address interception processing logic is maintained and included in the webpage data by the server. The one or more links are presented within the application based at least in part on the webpage data. In response to a user selection of a link of the one or more links, at least a portion of the set of web address interception processing logic corresponding to a web address associated with the selected link is used to determine attribute information associated with a target page. A predetermined presentation format is selected from a plurality of predetermined presentation formats based at least in part on the attribute information associated with the target page. The target page presented is based at least in part on the selected predetermined presentation format.

FIG. 1 is a diagram showing an embodiment of a system for client side page processing. In the example, system 100 includes client device 102, network 104, and server 106. Network 104 includes high-speed data networks and/or telecommunication networks. Client device 102 communicates to server 106 over network 104.

While client device 102 is shown to be a mobile device in the example, other examples of client device 102 include a smart phone, a tablet device, a laptop, a desktop, and any other computing device. For example, a user may interact with an application executing at client device 102. A user interaction with the application (e.g., a user selection of a menu button associated with the application) can cause a request for data associated with a webpage to be generated.

The request for the webpage data can be sent from client device 102 over network 104 to server 106, which is configured to store the webpage data. The webpage data includes information (e.g., HyperText Markup Language) that describes the content to be presented in the webpage. In various embodiments, content to be presented in the webpage includes one or more links. In addition to the information that describes the content, including link(s) to be presented in the webpage, the webpage data also includes a set of web address interception processing logic (e.g., which is implemented as computer code). The set of web address interception processing logic is maintained and kept up-to-date by server 106. The set of web address interception processing logic describes how to obtain and/or determine attribute information corresponding to a target page in response to a user selection of a link at the webpage, as will be described in further detail below.

Client device 102 is configured to receive the webpage data including the set of web address interception processing logic. Client device 102 presents the webpage and its one or more links within a browser embedded in the application based on the received webpage data. In response to a user's selection of a link of the webpage, client device 102 is configured to execute a corresponding portion of the set of web address interception processing logic that was included in the webpage data to determine the attribute information corresponding to a target page to be presented. For example, the determined attribute information can be used to select a predetermined template stored by client device 102 to use to display the content associated with the target page. For example, at least some of the content to be displayed at the target page can be obtained from a location associated with a web address (URL) corresponding to the selected link. The target page can be presented within a browser embedded in the application or in a default web browser application of client device 102. The content to be presented at the target page can be formatted based on the selected predetermined template and/or other native settings associated with the application and/or client device 102 that are stored at client device 102.

By using server 106 to include the most up-to-date set of web address interception processing logic into the webpage data requested by an application executing at client device 102, client device 102 can avoid needing to update its current version of the application in order to utilize the updated set of web address interception processing logic associated with that webpage.

Figure 2:
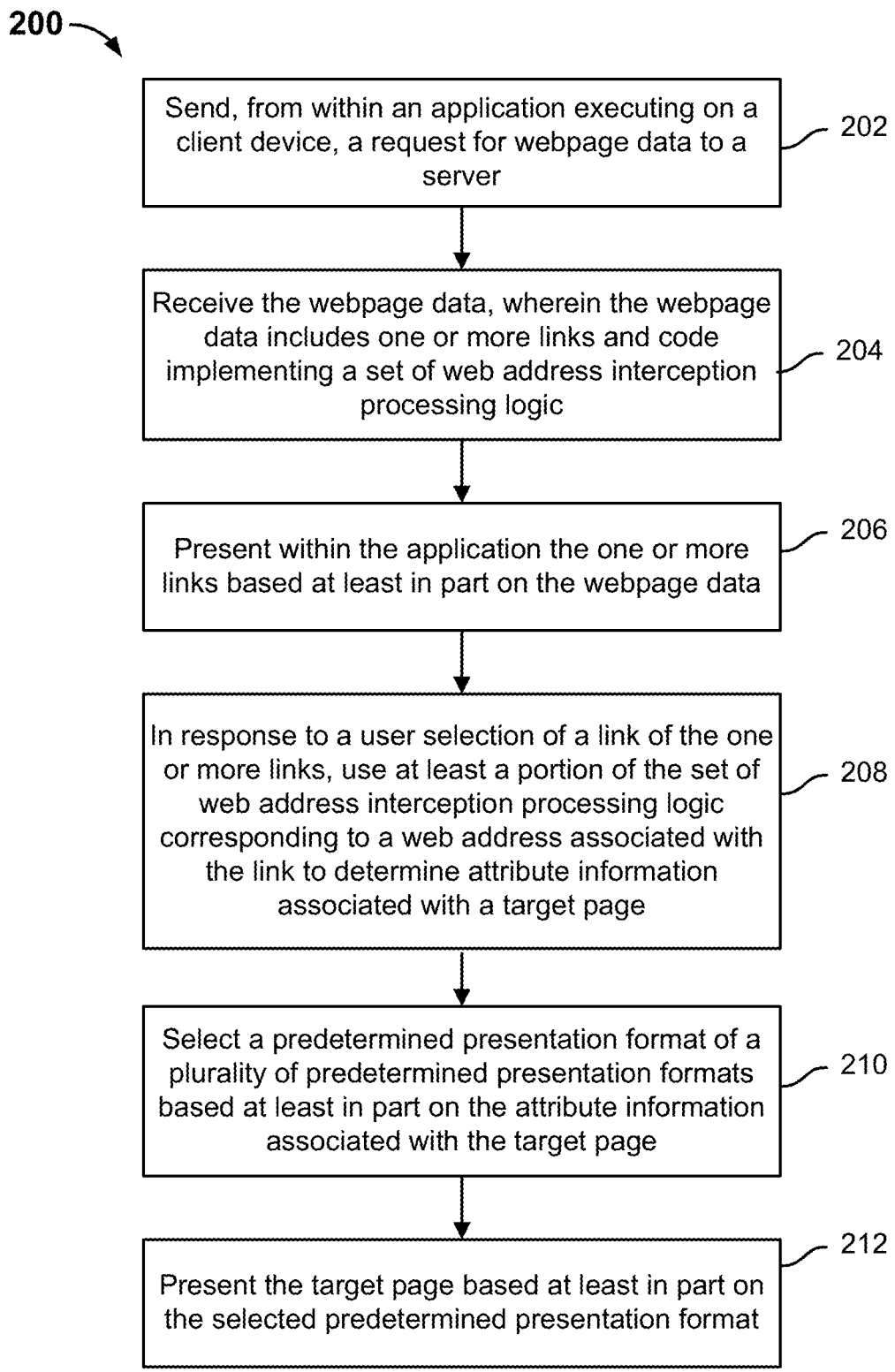
FIG. 2 is a flow diagram showing an embodiment of a process for client side page processing.

FIG. 2 is a flow diagram showing an embodiment of a process for client side page processing. In some embodiments, process 200 is implemented at system 100 of FIG. 1. Specifically, in some embodiments, process 200 is implemented at client device 102 of system 100 of FIG. 1.

At 202, a request for webpage data is sent from within an application executing on a client device to a server. An application executing on the client device may be prompted to generate a request for data associated with a webpage. For example, the request for the webpage data may be prompted by an automatic process associated with the application and/or a user interaction with the application.

A hybrid application is a type of application that runs on a client device. A hybrid application is an application that can utilize native features of the client device (e.g., a list of contacts, the GPS, the camera, etc.) as well as render webpage data (e.g., HTML) in a browser that is embedded in the application (as opposed to a default standalone web browser application of the client device). For example, on the Android™ platform, WebView is an example function that displays webpages within an application. In some scenarios, loading a webpage within an application may be desirable when the webpage content may be updated over time and/or it is more efficient to present content that is already available at a webpage.

In some embodiments, the application from which the request originates is a hybrid application. In some other embodiments, the application from which the request originates is a default web browser application.

For example, when a user uses a client device to browse an application, the user can use the application to log onto a webpage he/she wishes to browse by inputting a web address or by clicking on a button that leads to a presentation of the webpage. In response to this user input or click operation, the application can generate a corresponding request for the data associated with the desired webpage, and the client device can send the request to the server.

The webpage data can be a HyperText Markup Language (HTML) file. In some embodiments, the request for the webpage data is sent to a server associated with the webpage.

At 204, the webpage data is received, wherein the webpage data includes one or more links and code implementing a set of web address interception processing logic. The webpage data is received at the client device. The webpage data can include one or more links that are to be presented in the webpage. Each link can be associated with a web address (e.g., a URL). The webpage data may include information usable to determine how to present each link. For example, the HTML and/or other information of the webpage data can be used to present the contents (e.g., images, text) of the webpage, including the links, within the application.

In addition to information usable to determine how to present content at the webpage, the received webpage data also includes a set of web address interception processing logic corresponding to the one or more links of the webpage. In various embodiments, the server has already configured the webpage data to include an updated set of web address interception processing logic that is relevant to the one or more links included in the webpage. In other words, when the client device downloads the webpage data from the server, the client device also receives the web address interception processing logic that is relevant to the one or more links included in the webpage. The web address interception processing logic associated with a webpage is maintained (e.g., updated, configured) by the server. As such, if an update is needed to be made to the web address interception processing logic associated with the webpage, the server side will make such updates to its copy of the web address interception processing logic. When data associated with that webpage is later requested by a client device, that client device will receive the requested webpage data as well as the updated web address interception processing logic embedded in the webpage data. As a result, in various embodiments described herein, updates to the web address interception processing logic will not require the client device to update its current version of the application. For example, events that can prompt a change to the web address interception processing logic associated with the webpage can include a change to a link (e.g., URL) of the webpage and a change to the rules of the logic.

For example, the set of web address interception processing logic can be described by JavaScript code and therefore, in some embodiments, JavaScript code that describes the web address interception processing logic can be included in the webpage data. The JavaScript code can operate entirely as a front-end program or the JavaScript code can operate at the front-end program, which communicates with the back-end.

A set of web address interception processing logic is configured to obtain attribute information associated with a target page to be presented in response to a selection of a link. For example, the set of web address interception processing logic comprises a set of rules that determine the attributes of the target page to be presented in response to a selection of a link of the webpage. The attribute information associated with the target page determined by the set of web address interception processing logic may then be used to select a predetermined presentation format to use to display the content of the target page by functionalities associated with the application and/or the client device. In some embodiments, the content (e.g., text, images) to be presented at the target page is obtained at least by accessing the URL associated with the selected link. The content to be presented at the target page can be obtained independently from using the set of web address interception processing logic to determine the attribute information of the target page. An example to illustrate the difference between an attribute of the target page and the actual content of the target page is the following: the content type attribute of the target page can be a product details page and the actual content of the target page can be the images/text associated with a particular product. Put another way, in some embodiments, the set of web address interception processing logic is not necessarily used to obtain the actual content to be presented at the target page but can be used to infer the attributes of the content to be presented at the target page.

One example type of attribute information associated with the target page to be determined with the set of web address interception processing logic is a content type of the target page. The content type of a target page describes the type/category of the target page. Examples of target page content types (e.g., associated with an e-commerce website) include a product details page, a product listings page, a user login page, an activity page, and a product review page. A product details page includes content (e.g., an image, a description, a price) associated with a specific product, for example. A product listings page includes general information associated with various products (e.g., that are responsive to a particular search query), for example. A user login page includes fields that solicit login information from a user, for example. An activity page may include a feed of information, for example. A product review page includes feedback submitted by users for one or more products, for example.

Other example attribute information associated with the target page to be determined with the set of web address interception processing logic includes a product ID, a merchant shop ID, a product type, and/or a merchant shop type associated with content to be presented at the target page. A product ID identifies a specific product for which content is to be displayed at the target page. A merchant shop ID identifies a specific merchant shop for which information associated with the shop and/or products sold by that shop are to be displayed at the target page. A product type identifies a type of product for which content is to be displayed at the target page. A merchant shop type identifies a type of shop for which content is to be displayed at the target page.

In some embodiments, the set of web address interception processing logic is configured to determine attribute information associated with the target page from the URL of the selected link. In some embodiments, the set of web address interception processing logic is configured to determine attribute information associated with the target page corresponding to the selected link using web address (e.g., URL) recognition. The URL recognition can be performed by using character matching or regular expression matching, for example. Character matching or regular expression matching can match at least a portion of the URL associated with the selected link to a predetermined attribute type associated with the target page of the selected link. Character matching comprises matching at least portions of a URL to predetermined words. Regular expression matching comprises forming a search pattern of a sequence of characters and comparing the search pattern to at least portions of a URL. For example, the predetermined words of character matching and the regular expressions of regular expression matching can be designed to identify a content type, a product ID, a merchant shop ID, a product type, and/or a merchant shop type of the target page from the URL of the selected link. Character string matching and regular expression matching are merely examples of web address interception processing logic and any other suitable URL interception processing techniques may be used as well. For example, the matching portions of the URL can be extracted and used for further processing.

Below is an example of JavaScript code implementing a set of web address interception processing logic:

```
function parseUrl(url){
    if((/http:\/\/detail.tmall.com\/item.htm\?.*id=(\d+).*/).test(url)){ // matched
        console.log("This is a detail page."); // get url type
        console.log("Item id for detail is:" + RegExp.$1); // get business parameter: id
    }
}
// execute parse
parseUrl('http://detail.tmall.com/item.htm?id=22213672997');
```

In addition or alternative to determining attribute information associated with the target page from the URL of the selected link, in some embodiments, the set of web address interception processing logic is further configured to determine attribute information associated with the target page from the received webpage data (i.e., the webpage that included the set of web address interception processing logic). For example, the received webpage data may comprise DOM (Document Object Model) data of the current webpage. DOM is a standardized model supported by different web browsers, e.g., Internet Explorer®, Firefox®, and Google Chrome®, to represent the various components of a webpage. DOM data (e.g., including a DOM tree) is a cross-platform and language-independent convention for representing and interacting with objects in HTML documents, as well as XHTML and XML documents. Objects in a DOM tree may be addressed and manipulated using methods on the objects. In addition to DOM data, attribute information of the current webpage may also comprise other attribute information of the current webpage. For example, if the URL of the target page is a simple domain name which does not include enough attribute information to help determine a presentation format of the content of the target page, DOM data associated with the selected link in the received webpage data may include some attribute information concerning the target page that can be extracted.

Below is an example of DOM data included in the received webpage data:

As such, in some embodiments, the set of web address interception processing logic is configured to determine attribute information associated with the target page from the URL of the selected link and/or from the DOM data included in the received webpage data.

At 206, the one or more links are presented within the application based at least in part on the webpage data. The webpage is displayed within the application using the received webpage data. The displayed webpage includes the one or more links of the webpage as well as other content of the webpage (e.g., text, images). For example, each link can be displayed in the manner described by a corresponding portion of the webpage data.

At 208, in response to a user selection of a link of the one or more links, at least a portion of the set of web address interception processing logic corresponding to a web address associated with the link is used to determine attribute information associated with a target page. The user of the client device may browse the displayed webpage. The user may select (e.g., via a cursor click or a touchscreen selection) a displayed link of the webpage. Attribute information associated with a target page corresponding to the selected link can be determined, at least in part, by the set of web address interception processing logic. For example, in response to a user selection of a link at the webpage, at least a portion of the set of web address interception processing logic corresponding to the selected link can be invoked to execute an operation at the client device to determine the attribute information of the target page. For example, if the set of web address interception processing logic were implemented using JavaScript code, the client device is configured to invoke the JavaScript code to execute the logic. The executed set of web address interception processing logic can determine the attribute information of the target page. As described above, the set of web address interception processing logic can determine the attribute information of the target page from the URL associated with the selected link and/or from the (DOM data included in the) webpage data retrieved for the currently displayed webpage.

```
<!DOCTYPE html>
<html>
<head>
    <meta charset="utf-8">
    <meta content="width=device-width, initial-scale=1.0, maximum-scale=1.0, user-scalable=0" name="viewport"/>
    <title>Decathlon unisex casual sports shoulder bag NEWFEEL-tmall.com </title>
</head>
<body>
    <ul class="item_list">
        <li>
            <a href="http://detail.tmall.com/item.htm?id=22213672997" target="_blank" >
            <img src="http://gil.md.alicdn.com/bao/uploaded/i1/T1ArmxFzddXXXXXXXX_!!0-item_pic.jpg_360x360q90.jpg" width="148" height="148" />
            </a>
            <p class="act_pro_name"> Decathlon unisex casual sports shoulder bag NEWFEEL</p>
            <div class="act_price">
            <div class="price_yj">
            Price:¥249.00
            </div>
        </li>
    </ul>
</body>
</html>
```

As a first example, assume that the currently displayed webpage is associated with the URL of http://m.taobao.com, which is associated with an e-commerce website. In the example, a user selects a link displayed on the webpage and the selected link is associated with the following URL: http://m.taobao.com/iXYZ.htm. In the example, using character string matching or regular expression matching of the URL (e.g., the recognition techniques extract the value after ".com/" and before ".htm"), an online product ID (e.g., iXYZ) can be obtained from the URL. Thus, in this example, an attribute comprising the product ID of iXYZ associated with the target page is determined from the URL of the selected link.

As a second example, assume that the currently displayed webpage is associated with the URL of http://m.tmall.com, which is associated with an e-commerce website. In the example, a user selects a link displayed on the webpage and the selected link is associated with the following URL: http://nike.m.tmall.com. In the example, the URL of the selected link (http://nike.m.tmall.com) does not contain the target page's attribute of store ID. However, attribute information such as the store ID associated with the target page can be determined, for example, from the DOM data of the currently displayed webpage (e.g., in the store activities page or the store searchlist). Therefore, attribute information associated with the target page, such as the store ID, can be determined from the webpage data (e.g., the DOM data) of the current page in the event that the URL associated with the selected link does not provide such attribute information.

At 210, a predetermined presentation format of a plurality of predetermined presentation formats is selected based at least in part on the attribute information associated with the target page.

In various embodiments, the attribute information determined for the target page using the set of web address interception processing logic included in the webpage data is used to select a predetermined presentation format to use to display the content associated with the target page. An example of a predetermined presentation format is a predetermined template.

Each template describes a page layout, control settings, button appearance, and/or other elements that determine a manner of presenting the content of the target page. For example, different templates describe different page layouts, control settings, and/or button appearance. In some embodiments, each different content type (e.g., a product details page, a product listing page, a user login page, an activity page, and a product review page) is predetermined to be associated with a different template stored at the client device. In some embodiments, each set of one or more values corresponding to one or more of product ID, merchant shop ID, product type, and/or merchant shop type can be predetermined to be associated with a different template stored at the client device. To give a specific example, certain values of product ID, merchant shop ID, product type, and/or merchant shop type can be associated with a masculine type (e.g., a product or a shop that includes products exclusively for men) or a feminine type (e.g., a product or a shop that includes products exclusively for women) and a corresponding masculine-style template or feminine-style template can be used to display the target page.

For example, templates are predetermined. For example, templates can be downloaded with the initial copy of the application to the client device or templates are native to the client device. The predetermined corresponding relationships between templates and various (e.g., combinations of) one or more target page attributes (e.g., content types, product IDs, merchant shop IDs, product types, and/or merchant shop types) can be stored with the application at the client device. Therefore, the predetermined template corresponding to a particular set of attribute information associated with a target page can be selected from the set of templates stored at the client device.

At 212, the target page is presented based at least in part on the selected predetermined presentation format.

In some embodiments, the content accessed for the target page may be presented in the application via a browser functionality (e.g., WebView) associated with the browser. In some embodiments, the target page may be presented in a default (standalone) web browser application of the client device. In some embodiments, whether the target page is presented within the browser embedded inside the application or within the client device's default web browser application can be determined by the set of web address interception processing logic associated with the selected link.

The content of the target page is presented using the predetermined presentation format (e.g., template) that was selected based on the attribute information associated with the target page. Thus, the manner in which the content of the target page appears is determined based on the selected template. The target page can open in a new browser window or in the same window as the webpage at which the selected link was displayed.

In some embodiments, in addition to the selected predetermined presentation format, the content of the target page can also be modified/determined by other special settings associated with the application and/or client device. Examples of special settings may include transitions between pages (e.g., a progress bar that indicates the loading progress of the target page) and fadeout effects on the opening and/or closing of the target page.

In some embodiments, prior to presenting the target page, the content of the target page information is analyzed to determine whether or not to display the target page at all. For example, if the analysis results of the content of the target page information indicate that the content of the target page information contains malicious or harmful content, then the target page is prevented from being displayed to increase security at the client device.

Because the set of web address interception processing logic is included in the requested webpage data in various embodiments described herein, updates to the set of web address interception processing logic can be dynamically performed at the server that stores the webpage data without requiring the client device to download updated versions of the application. As such, the client device can simultaneously receive updated sets of web address interception processing logic relevant to a webpage with the requested webpage data itself. Allowing the set of web address interception processing logic to be maintained at the server with the webpage data enables the web address interception processing logic to be more conveniently updated and also distributed to the relevant client devices.

Figure 3:
FIG. 3 shows a presentation of an example target page.

FIG. 3 shows a presentation of an example target page. For example, target page 300 can be displayed within an application executing at a client device. Target page 300 is displayed based on a predetermined template selected based on attribute information determined for the target page using a set of web address interception processing logic associated with the link that was selected to cause the loading of target page 300. The selected link was displayed on another webpage and the URL associated with the selected link and target page 300 is, for example: http://detail.tmall.com/item.htm?spm=a220m.1000858.1000725.1.PN47JO&id=24721196885&areaId=310000&user_id=3. Prior to displaying target page 300, an attribute of target page 300 determined using the set of web address interception processing logic is that the content type of target page 300 is a product details page. As such, a predetermined template stored at the client device associated with the product details page content type was selected and used to display the acquired content of target page 300. For example, the selected template associated with the product details page content type is described to display different size images of the product featured in the product details page on the left side of the target page, information (e.g., product name, product price, average product rating) in the center of the target page, buttons below the information in the center of the target page, and images of previously viewed items on the right side of the target page.

Figure 4:
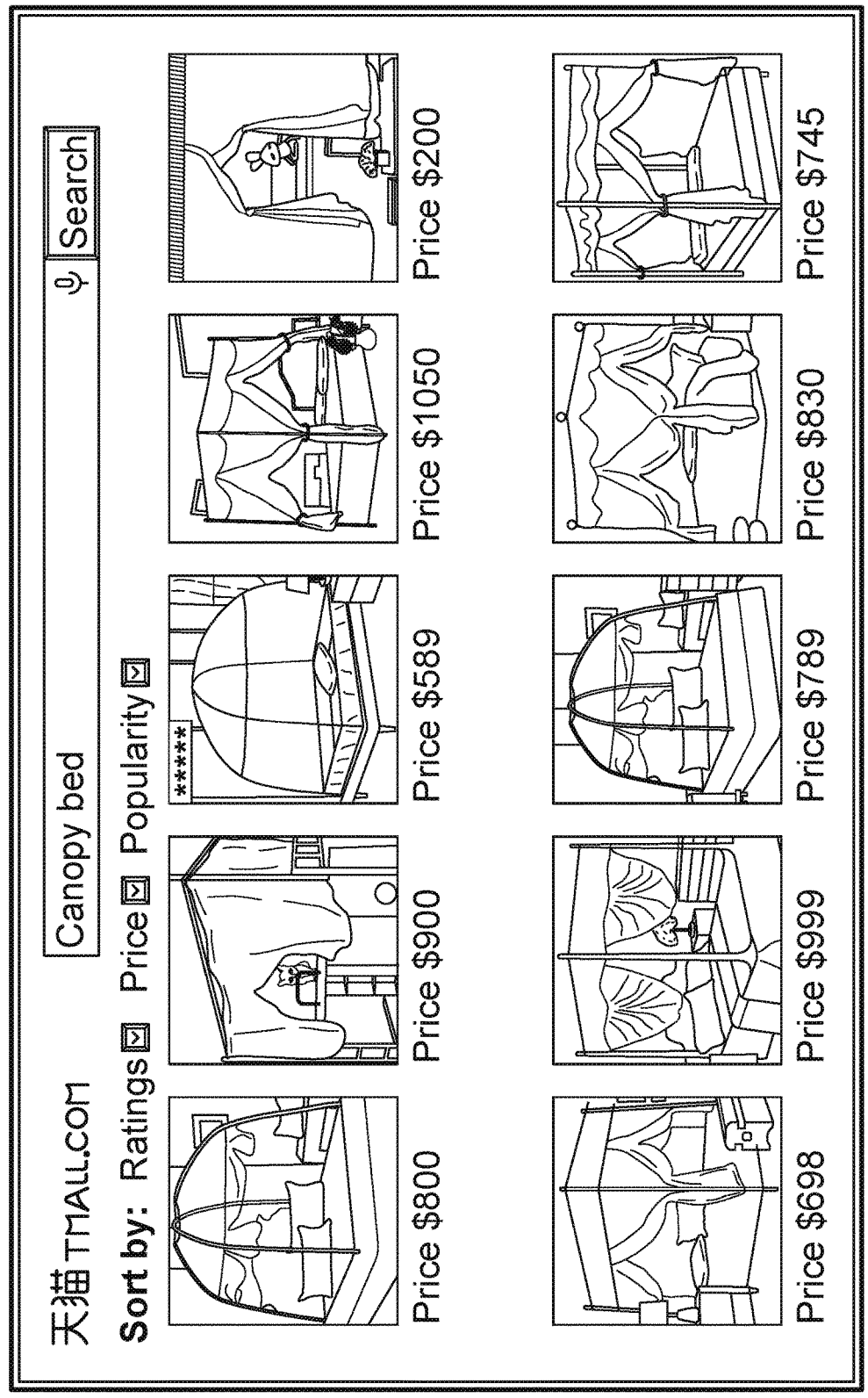
FIG. 4 shows a presentation of an example target page.

FIG. 4 shows a presentation of an example target page. For example, target page 400 can be displayed within an application executing at a client device. Target page 400 is displayed based on a predetermined template selected based on attribute information determined for the target page using a set of web address interception processing logic associated with the link that was selected to cause the loading of target page 400. The selected link was displayed on another webpage and the URL associated with the selected link and target page 400 is, for example: http://list.tmall.com/search_product.htm?q=%CE%C3%D5%CA&type=p&style=&cat=&from=qRecommend_1_qRecommend. Prior to displaying target page 400, an attribute of target page 400 determined using the set of web address interception processing logic is that the content type of target page 400 is a product listings page. As such, a predetermined template stored at the client device associated with the product listings page content type was selected and used to display the acquired content of target page 400. For example, the selected template associated with the product listings page content type is described to display a logo of the e-commerce website at the top left corner of the target page, a search bar at the top center of the target page, controls associated with sorting product listings below the logo and search bar of the target page, and images of five product listings in each row below the sorting controls of the target page.

Figure 5:
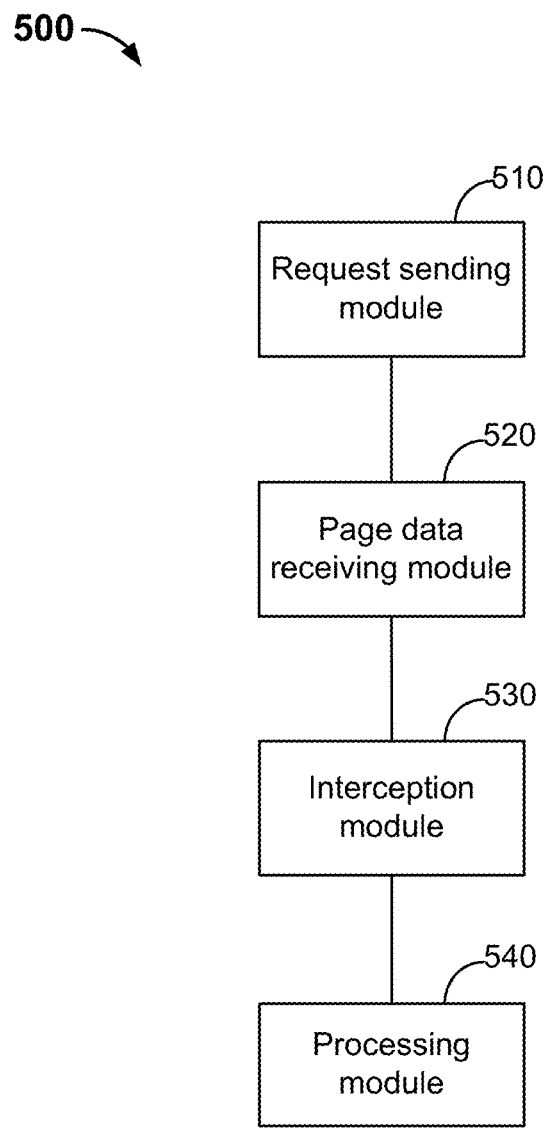
FIG. 5 is a diagram showing an embodiment of a client device.

FIG. 5 is a diagram showing an embodiment of a client device. In some embodiments, process 200 of FIG. 2 is implemented by the client device 500 of FIG. 5. In the example, client device 500 includes: request sending module 510, page data receiving module 520, interception module 530, and processing module 540.

The modules can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Request sending module 510 is configured to send the server a request for data associated with a webpage. In various embodiments, the request for the webpage data is generated by an application executing at the client device. For example, the request can be generated based on a user interaction with the application.

Page data receiving module 520 is configured to receive from the server the webpage data. The webpage data includes one or more links and also a set of web address interception processing logic. The set of web address interception processing logic can be configured at the server side and included in the webpage data at the server side. Therefore, the webpage data includes the content (e.g., images, text, links) associated with the requested webpage as well as the set of web address interception processing logic relevant to the links of the webpage. In some embodiments, page data receiving module 520 is configured to present the one or more links of the webpage within the application based on the webpage data.

In response to a user selection of a link at the webpage, interception module 530 is configured to use at least a portion of the set of web address interception processing logic corresponding to a web address (e.g., URL) associated with the link to determine attribute information associated with a target page. In some embodiments, the set of web address interception processing logic corresponding to the web address may extract attribute information from the web address (URL) through URL recognition. In some embodiments, the set of web address interception processing logic corresponding to the web address may obtain attribute information from the received webpage data associated with the current webpage.

Processing module 540 is configured to select a predetermined presentation format of a plurality of predetermined presentation formats based at least in part on the attribute information associated with the target page. In some embodiments, the predetermined presentation format is selected based on predetermined corresponding relationships between target page attribute information and predetermined presentation formats stored by the client device. Processing module 540 is further configured to present a target page based at least in part on the selected predetermined presentation format. The target page associated with the selected link can be presented within the application via a browser embedded in the application or in the client device's separate default web browser application. In some embodiments, the content to be presented at the target page is also determined using special settings associated with the application and/or the client device. In some embodiments, processing module 540 can prevent presenting the target page at all if it is determined that the obtained target page information contains malicious or harmful content.

Figure 6:
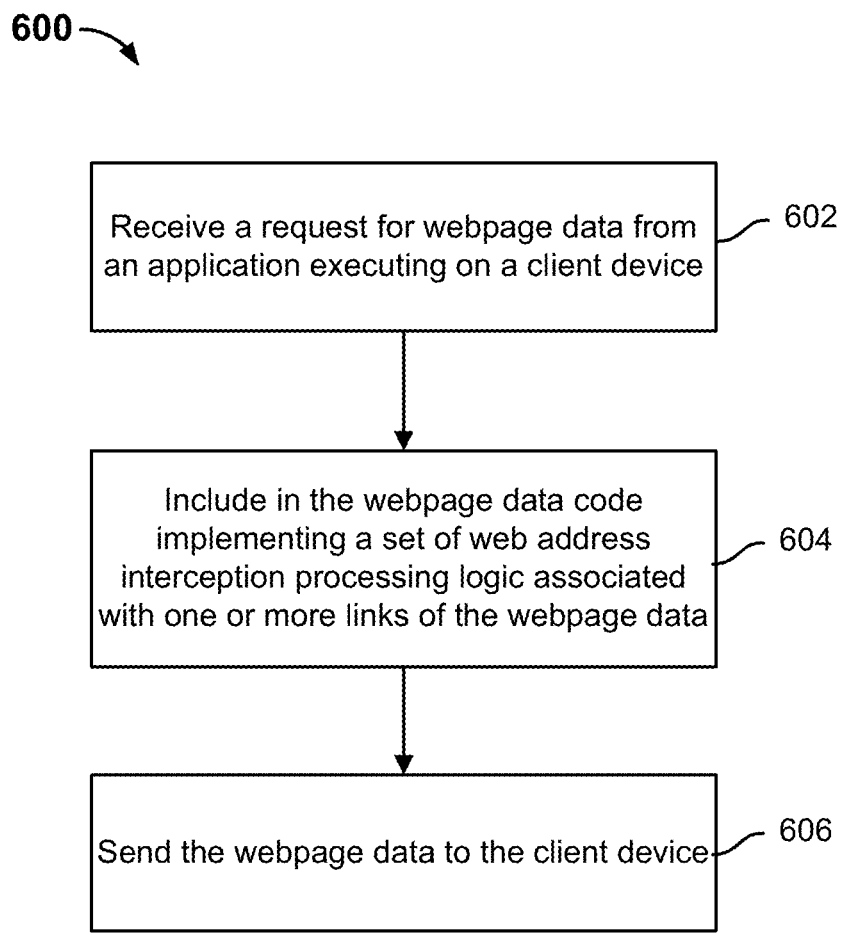
FIG. 6 is a diagram showing an embodiment of a process for sending webpage data to a client device.

FIG. 6 is a diagram showing an embodiment of a process for sending webpage data to a client device. In some embodiments, process 600 is implemented at system 100 of FIG. 1. Specifically, in some embodiments, process 600 is implemented at server 106 of system 100 of FIG. 1.

At 602, a request for webpage data is received from an application executing on a client device. For example, a user interaction with the application may have prompted the request for data associated with a webpage to be presented within the application. The request for the webpage data is received at a server that is configured to store the webpage data.

At 604, code implementing a set of web address interception processing logic associated with one or more links of the webpage data is included in the webpage data. In various embodiments, the server that is configured to store the webpage data is also configured to configure and maintain the code implementing the set of web address interception processing logic associated with that webpage. For example, if web address interception processing logic is not already included in the webpage data, then the web address interception processing logic (e.g., a JavaScript code) can be added into the webpage data. For example, each link (and associated URL) of the webpage data may be associated with a corresponding portion of the set of the web address interception processing logic. For example, the corresponding portion of the set of the web address interception processing logic for a particular URL can indicate how web address interception processing should be performed with respect to that particular URL.

In some embodiments, each time that the server receives a request for the webpage data, the server is configured to first check whether the set of the web address interception processing logic associated with the link(s) of the webpage data is already included in the webpage data. If the webpage does not already include the set of the web address interception processing logic associated with the link(s), then the server is configured to add the set of the web address interception processing logic to the webpage data before sending the webpage data to the requesting client device. If the webpage data already includes the set of the web address interception processing logic associated with the link(s), then the server is configured to check whether the set of the web address interception processing logic associated with the link(s) currently included in the webpage data has already been updated in light of a recent change, if any. If the set of the web address interception processing logic associated with the link(s) has already been updated at the server side, then the server is configured to send the webpage data including the updated set of the web address interception processing logic associated with the link(s) to the requested client devices. However, if the set of the web address interception processing logic associated with the link(s) has not yet been updated, then the server is configured to update the existing set of the web address interception processing logic associated with the link(s) in the webpage data with one or more changes received for that set of web address interception processing logic. Then, the server is configured to send the webpage data including the newly updated set of the web address interception processing logic associated with the link(s) to the requested client devices.

As such, the webpage data returned by the server to the client device is ensured to include not only requested webpage data but also the update-to-date (e.g., code implementing the) web address interception processing logic corresponding to the link(s) included in the webpage. By sending updated web address interception processing logic corresponding to the link(s) included in a webpage with the webpage data in response to a request for that webpage data, changes to the web address interception processing logic can be made on the server side without requiring updates to the application executing at the client device. Put another way, by maintaining updates to the web address interception processing logic in webpage data at the server side, new versions of client applications with the updated web address interception processing logic do not need to be downloaded and installed.

In response to a user selection of a link at the webpage displayed at the client device, at least a portion of the set of web address interception processing logic corresponding to the selected link can be invoked to execute an operation at the client device to determine the attribute information associated with a target page. For example, if the set of web address interception processing logic were implemented using JavaScript code, the client device is configured to invoke the JavaScript code to execute the logic. The executed set of web address interception processing logic can determine the attribute information of the target page, for example, by extracting data from the URL associated with the selected link or from DOM data included in the webpage data retrieved for the currently displayed webpage.

At 606, the webpage data is sent to the client device. In some embodiments, the application executing at the client device is configured to present the webpage within the application using the webpage data. Then, in the event that a link of the webpage becomes selected, the portion of the web address interception processing logic included in the webpage data that is associated with the selected link is executed to determine attribute information associated with a target page to be displayed.

Figure 7:
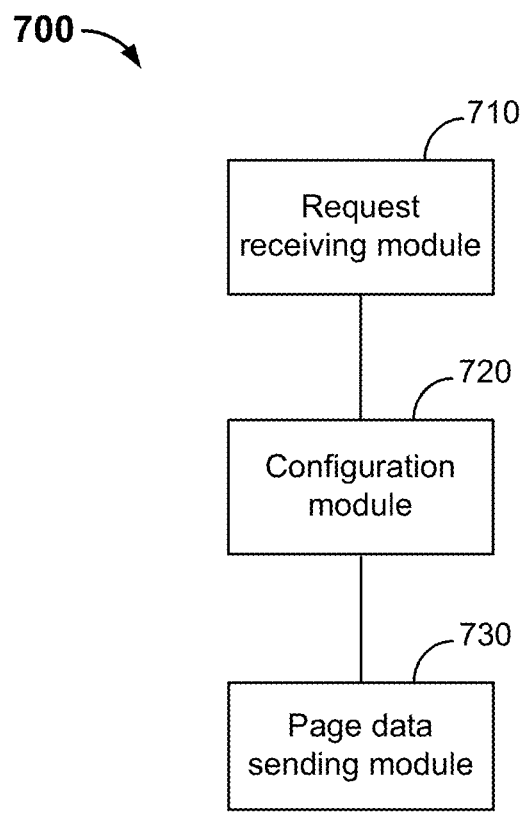
FIG. 7 is a diagram showing an embodiment of a server for sending webpage data to a client device.

FIG. 7 is a diagram showing an embodiment of a server for sending webpage data to a client device. In some embodiments, process 600 of FIG. 6 is implemented at server 700 of FIG. 7. In the example, server 700 includes: request receiving module 710, configuration module 720, and page data sending module 730.

The modules can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Request receiving module 710 is configured to receive a request for webpage data from an application executing on a client device. In response to receipt of the request from the client device, request receiving module 710 is configured to notify configuration module 720 to configure and/or update a set of web address interception processing logic corresponding to the one or more links of the webpage. Configuration module 720 is then configured to include the updated set of web address interception processing logic into the requested webpage data.

Page data sending module 730 is configured to return the webpage data including the set of web address interception processing logic to the client device.

The present application can be described in the general context of computer executable commands executed by a computer, such as a program module or unit. Generally, program modules or units can include routines, programs, objects, components, data structures, etc., to execute specific tasks or achieve specific abstract data types. The program module or unit can be realized by software, hardware, or a combination of the two. The present application can also be carried out in distributed computing environments. In such distributed computing environments, tasks are executed by remote processing equipment connected via communication networks. In distributed computing environments, program modules or units can be located on storage media at local or remote computers that include storage equipment.

This document has employed specific examples to describe the principles and embodiments of the present application. The above descriptions of the embodiments are only intended to aid in the comprehension of the method of the present application and its main ideas; at the same time, persons skilled in the art may make modifications to specific embodiments and the scope of the application. Any such revisions, equivalent substitutions, or improvements that fall within the spirit and principles of the present application should be included in the scope of the claims of the present application. To summarize the above, the contents of this description should not be understood as limiting the present application.

A person skilled in the art should understand that the embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

In one typical configuration, the computer equipment comprises one or more processors (CPUs), input/output interfaces, network interfaces, and memory. Memory may include such forms as volatile storage devices in computer-readable media, random access memory (RAM) and/or non-volatile memory, such as read-only memory (ROM) or flash memory (flash RAM). Memory is an illustrative example of computer-readable media.

Computer-readable media including permanent, volatile, mobile and non-removable media can be used to store information using any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory, read-only memory (ROM), electrically erasable programmable read-only memory (EEPROM), flash memory, other memory technology, CD-ROM, digital multifunction disc (DVD) or other optical storage, magnetic cassettes, magnetic tape or magnetic disc memory, other magnetic storage equipment, or other non-transmission media that can be used to store information that is accessible to computers. As defined in this document, computer-readable media does not include transitory computer-readable media, such as modulated data signals and carrier waves.

The above are merely embodiments of the present application and are not intended to limit the present application. For persons skilled in the art, the present application could make various modifications and changes. Any revision, equivalent substitution, or improvement made within the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A client device, comprising:
one or more processors configured to:
send, from within an application executing on the client device, a request for webpage data to a server;
receive the webpage data, wherein the webpage data includes one or more links and code implementing a set of web address interception processing logic;
present, within the application, the one or more links within the application based at least in part on the webpage data;
in response to a user selection of a link of the one or more links, use at least a portion of the set of web address interception processing logic corresponding to a web address associated with the link to determine attribute information associated with a target page, including to execute code associated with the portion of the set of web address interception processing logic to perform identification to match at least a portion of the link to a predetermined attribute type associated with the target page;
select a predetermined presentation format from a plurality of predetermined presentation formats based at least in part on the attribute information and the predetermined attribute type associated with the target page; and
present the target page based at least in part on the selected predetermined presentation format; and
one or more memories coupled to the one or more processors and configured to provide the one or more processors with instructions.

2. The client device of claim 1, wherein the code implementing the set of web address interception processing logic is maintained up-to-date at the server.

3. The client device of claim 1, wherein to perform identification comprises using character matching or a regular expression.

4. The client device of claim 3, wherein using the character matching or the regular expression comprises extracting a matching portion of the web address as an attribute corresponding to the predetermined attribute type associated with the target page.

5. The client device of claim 1, wherein to use the at least the portion of the set of web address interception processing logic corresponding to the web address associated with the link to determine the attribute information associated with the target page includes to execute the code associated with the portion of the set of web address interception processing logic to obtain Document Object Model (DOM) data associated with a webpage associated with the webpage data.

6. The client device of claim 1, wherein the predetermined attribute type associated with the target page includes one or more of the following: content type, product ID, merchant shop ID, product type, and merchant shop type.

7. The client device of claim 6, wherein the content type includes one or more of the following: product details page, product listings page, activity page, user login page, and product review page.

8. The client device of claim 1, wherein to select the predetermined presentation format from the plurality of predetermined presentation formats is based at least in part on stored corresponding relationships between target page attribute information and predetermined presentation formats.

9. The client device of claim 1, wherein the selected predetermined presentation format describes one or more of a page layout, control settings, and button appearance associated with content to be presented at the target page.

10. The client device of claim 1, wherein the target page is presented within the application.

11. A method, comprising:
sending, from within an application executing on a client device, a request for webpage data to a server;
receiving the webpage data, wherein the webpage data includes one or more links and code implementing a set of web address interception processing logic;

presenting, within the application, the one or more links within the application based at least in part on the webpage data;

in response to a user selection of a link of the one or more links, using at least a portion of the set of web address interception processing logic corresponding to a web address associated with the link to determine attribute information associated with a target page, including executing code associated with the portion of the set of web address interception processing logic to perform identification to match at least a portion of the link to a predetermined attribute type associated with the target page;

selecting a predetermined presentation format from a plurality of predetermined presentation formats based at least in part on the attribute information and the predetermined attribute type associated with the target page; and presenting the target page based at least in part on the selected predetermined presentation format.

12. The method of claim 11, wherein the code implementing the set of web address interception processing logic is maintained up-to-date at the server.

13. The method of claim 11, wherein to perform identification comprises using character matching or a regular expression.

14. The method of claim 13, wherein using the character matching or the regular expression comprises extracting a matching portion of the web address as an attribute corresponding to the predetermined attribute type associated with the target page.

15. The method of claim 11, wherein using at least the portion of the set of web address interception processing logic corresponding to the web address associated with the link to determine the attribute information associated with the target page includes executing the code associated with the portion of the set of web address interception processing logic to obtain Document Object Model (DOM) data associated with a webpage associated with the webpage data.

16. The method of claim 11, wherein the predetermined attribute type associated with the target page includes one or more of the following: content type, product ID, merchant shop ID, product type, and merchant shop type.

17. The method of claim 16, wherein the content type includes one or more of the following: product details page, product listings page, activity page, user login page, and product review page.

18. The method of claim 11, wherein selecting the predetermined presentation format from the plurality of predetermined presentation formats is based at least in part on stored corresponding relationships between target page attribute information and predetermined presentation formats.

19. The method of claim 11, wherein the selected predetermined presentation format describes one or more of a page layout, control settings, and button appearance associated with content to be presented at the target page.

20. A computer program product, the computer program product being embodied in a non-transitory computer readable storage medium and comprising instructions for:

sending, from within an application executing on a client device, a request for webpage data to a server;

receiving the webpage data, wherein the webpage data includes one or more links and code implementing a set of web address interception processing logic;

presenting, within the application, the one or more links within the application based at least in part on the webpage data;

in response to a user selection of a link of the one or more links, using at least a portion of the set of web address interception processing logic corresponding to a web address associated with the link to determine attribute information associated with a target page, including executing code associated with the portion of the set of web address interception processing logic to perform identification to match at least a portion of the link to a predetermined attribute type associated with the target page;

selecting a predetermined presentation format from a plurality of predetermined presentation formats based at least in part on the attribute information and the predetermined attribute type associated with the target page; and presenting the target page based at least in part on the selected predetermined presentation format.

* * * * *